April 9, 1957  M. D. WALLACE  2,788,227
COMBINATION HITCH AND TONGUE SUPPORT ACTUATOR
Filed Aug. 13, 1956  2 Sheets-Sheet 1
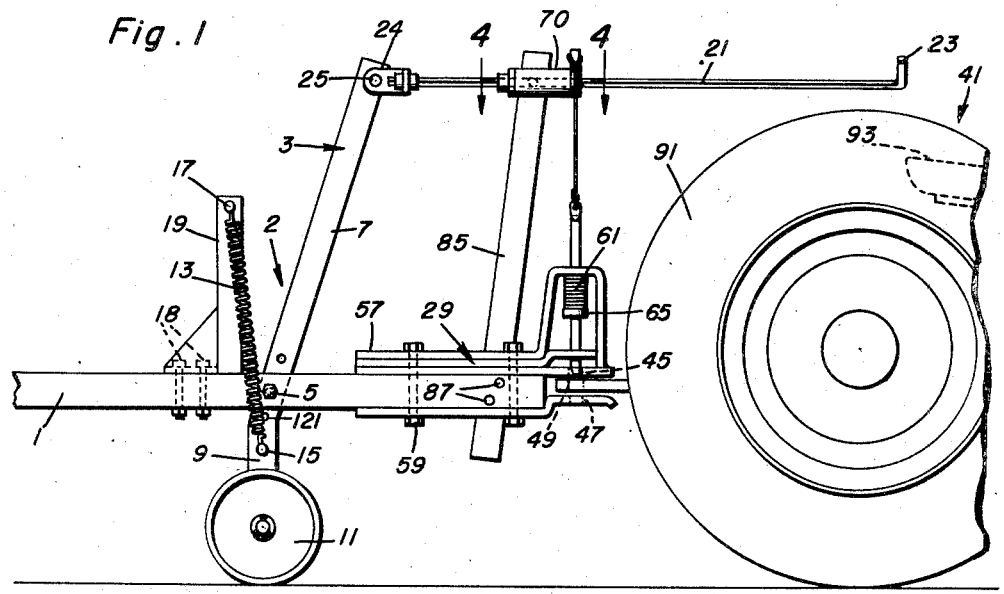
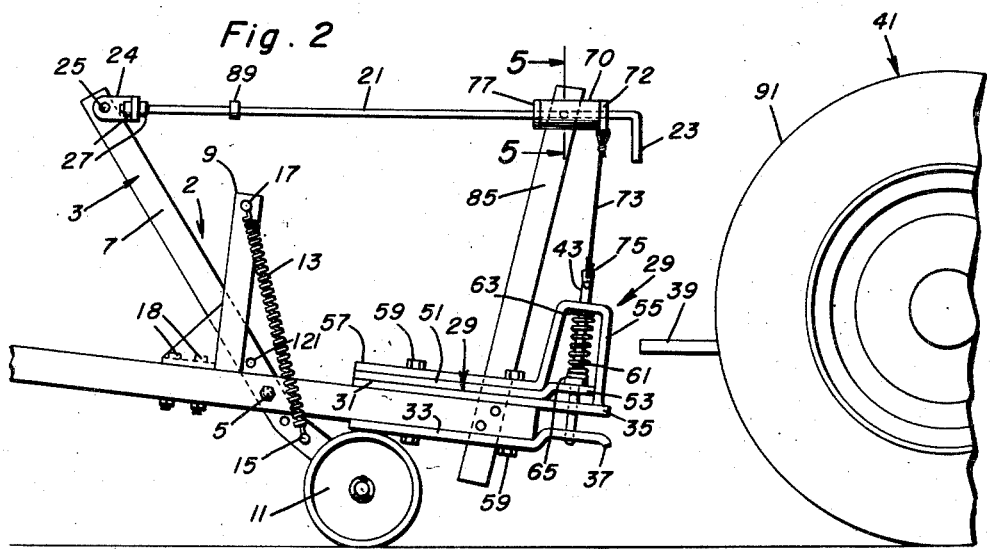
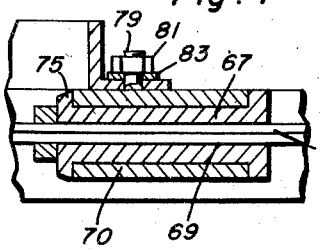
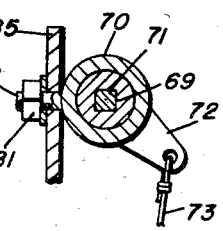
Merle D. Wallace
INVENTOR.
BY April 9, 1957

M. D. WALLACE 2,788,227

COMBINATION HITCH AND TONGUE SUPPORT ACTUATOR

Filed Aug. 13, 1956

Merle D. Wallace
INVENTOR.

BY
Attorneys

United States Patent Office 2,788,227
Patented Apr. 9, 1957

2,788,227

COMBINATION HITCH AND TONGUE SUPPORT ACTUATOR

Merle D. Wallace, Chopin, Iowa

Application August 13, 1956, Serial No. 603,478

5 Claims. (Cl. 280—475)

My invention relates to improvements in hitches for coupling the vertically swingable tongue of a trailer wagon to the drawbar of a tractor.

The primary object of my invention is to provide hitch means on the tongue, and jacking means on the tongue for raising the tongue so that the hitch means may be coupled to a tractor drawbar backed up to the hitch means, and means operative by a driver on the tractor seat for operating the jacking means and operating the hitch means to couple the same to the drawbar or for uncoupling therefrom.

Another object is to provide an operating rod for operating both the jacking means and the hitch means by a driver on the tractor seat.

Still another object is to provide an operating rod which is slidable to operate the jacking means and rotatable to operate the hitch means.

Still another object is to provide means in accordance with the foregoing which is attachable to a tractor wagon tongue without change in the tongue.

Yet another object is to provide means as in the foregoing of comparatively simple construction and not liable to get out of order.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary view in side elevation of my invention, in a preferred embodiment thereof, with the tongue raised and the hitch means positioned for coupling to the tractor drawbar;

Figure 2 is a fragmentary view in side elevation of the same with the tongue lowered and the hitch means uncoupled from the drawbar;

Figure 4 is an enlarged fragmentary view in horizontal section taken on the line 4—4 of Figure 1;

Figure 5 is an enlarged fragmentary view in vertical transverse section taken on the line 5—5 of Figure 2.

Figure 3:
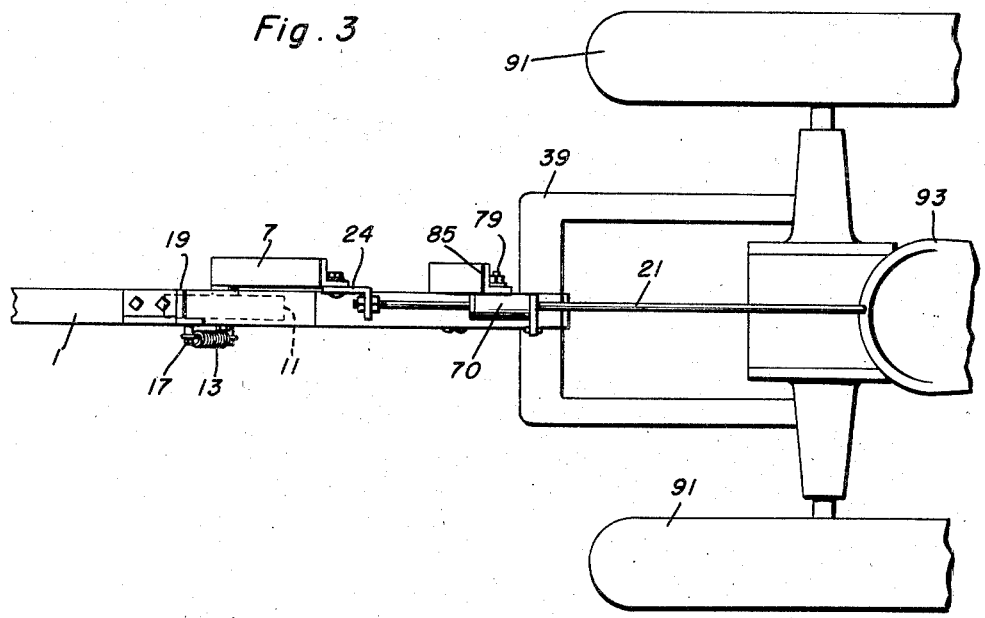
Figure 3 is a fragmentary view in plan.

Referring to the drawings by numerals, and first to Figures 1 to 5, according to my invention, in the preferred embodiment thereof, the vertically swingable tongue 1 of a trailer wagon, not shown, is provided with jacking means for raising and lowering the same to raise and lower the hitch means on the tongue into and from hitching position.

The jacking means, designated generally by the numeral 2 comprises an upright jacking lever 3 pivoted intermediate its ends, by a transverse bolt 5, to an intermediate portion of the tongue 1 and having a long lever arm 7 above the tongue 1 and bolt 5, and a short lever arm 9 below said tongue 1 and bolt 5 provided with a terminal ground engaging wheel 11. The jacking lever 3 is swingable in opposite directions on the wheel 11 and pivot bolt 5 into tongue lowering and raising positions, respectively, by swinging of the long arm 7 forwardly and rearwardly to raise and lower the pivot bolt 5 relative to the ground engaging wheel 11. The jacking lever 3 is preferably an angle bar.

A past dead center lock is provided for yieldingly retaining the jacking lever 3 in its opposite positions and comprises a helical tension spring 13 having one end connected, as at 15 to the short lever arm 9 below the pivot bolt 5, and its other end connected, as at 17, to an upright 19 on the tongue 1 bolted, as at 18, thereto in the rear of the pivot bolt 5 so that said spring 13 exerts pull against the short arm 9 at opposite sides of the pivot bolt 5 in both positions of said jacking lever 3.

Operating means for the jacking lever 3 comprises a horizontal push-pull rod 21 extending forwardly therefrom and of the tongue 1 and provided with a crank handle 23 on its front end for operating the same. The rod 21 is rotatably connected at its rear end to the upper end of the long lever arm 7, for a purpose presently seen, by means of a right angled link 24 pivoted, as at 25, to said arm 7 and through which said rod 21 rotatably extends with keeper nuts 27 thereon on opposite sides of said link 24.

The hitch means, designated generally by the numeral 29, comprises a pair of upper and lower hitch bars 31, 33 extending along the top and bottom of the tongue 1 and having front vertically spaced ends 35, 37 adapted to straddle the drawbar 39 of a tractor 41. A vertical coupling pin 43 is provided for advance and retraction into and from coupling position through openings 45, 47 in said ends, 35, 37, and through an opening 49 in the drawbar 39.

Guide means is provided for the coupling pin 43 comprising a guide bar 51 extending along the upper bar 31 with an upwardly offset front end 53 through which the coupling pin 43 slidably extends, and a vertical inverted U-shaped yoke 55 through which said coupling pin 43 is slidable and which straddles the front end 53 of the upper hitch bar 31 and is formed on an attaching bar 57 overlying the guide bar 51. Bolts 59 secure all the bars 31, 33, 51, 57 to the tongue 1.

A helical spring 61 on the coupling pin 43 and in the yoke 55 is interposed between a boss 63 on the upper end of the yoke 55, and a collar 65 fast on the coupling pin 43 and loads said coupling pin to advance the same into coupling position.

The push-pull rod 21 is operatively connected to the coupling pin 43 to retract said pin in opposition to the spring 63 into uncoupling position in response to rotation of said rod 21. For this purpose, said rod 21 slidably extends through a horizontal rotary sleeve 67 having a polygonal bore 69 through which a polygonal midportion 71 of said rod is slidable and thereby splined to said sleeve for rotation of the sleeve by said rod 21. The sleeve 67 is rotatable in a relatively fixed tubular bearing 70 and has a crank arm 72 on its front end connected by a pull cable 73 to the upper end 75 of the coupling pin 43. A collar 77 on the other end of said sleeve 63, together with the crank arm 72, prevents endwise play of said sleeve 67 in the bearing 70. As will be seen, the pull-push rod 21 is slidable forwardly and rearwardly in the sleeve 67 to swing the jacking lever 3 into tongue raising and lowering positions respectively.

A lateral horizontal stud 79 on the bearing 70 with a securing nut 81 and a washer 83 thereon extends through the upper end of an upright supporting angle bar 85 bolted at 87 to the tongue 1 between the jacking lever 3 and coupling pin 43. By this means, the sleeve 67 and bearing 70 may rock vertically to compensate for vertical throw of the push-pull rod 21.

A set collar 89 on the push-pull rod 21 engages the collar 79 and limits forward sliding of said rod 21. The wheel 11 engages the lower hitch bar 33 and limits rearward sliding of the push-pull rod and also establishes the lowered position of the tongue 1.

The described preferred embodiment of the invention is designed for coupling the tongue 1 to a tractor 41 having the drawbar 39 extending rearwardly of the rear wheels 91 and the driver's seat forward of the rear wheel axle and the pull-push rod 21 is designed to be of sufficient length for operation by a driver, not shown, on the tractor seat 93 when the tractor 41 has been backed to position the drawbar 39 slightly in advance of the hitch bars 31, 33.

With the tractor 41 backed as in the preceding paragraph and the tongue 1 in lowered position, as shown in Figure 2, and the tractor and trailer on level ground, the driver reaches behind him and pulls the push-pull rod 21 forwardly to cause the jacking lever to swing in a direction to raise the tongue 1 in which position it is substantially horizontal as shown in Figure 1. The driver then rotates the push-pull rod 21, in either direction, to retract the coupling pin 43 into uncoupling position shown in Figure 1. The drawbar 39 may then be backed by the tractor 4 in between the front ends 35, 37 of the hitch bars 31, 33. Then the push-pull rod is released by the driver whereupon the spring 61 will advance the coupling pin 43 to couple the hitch bars 31, 33, and hence the tongue 1, to the drawbar 39.

After the tongue 1 is coupled, or hitched, the push-pull rod 21 may be slide rearwardly to cause the jacking lever 3 to swing in the opposite direction for retracting the wheel 11 from the ground, or the drawbar 39 may be lifted by the power lift to raise the tongue 1 and lift the wheel off the ground. The manner in which uncoupling is accomplished together with lowering of the tongue 1 will be readily understood without further description.

As tractor drawbars are fixed on the tractor when pulling a trailer or wagon the trailer tongue 1 must be capable of being raised to the proper height for hitching to the drawbar 39 when the trailer and tractor are at different levels. Hence the lever arm 9 must be of sufficient length to raise the tongue 1 so that the latch bars 31, 33 are at least an inch or two higher than the drawbar 39 when the trailer and tractor are on level ground or floor so that the hitch can be used when the trailer and tractor are on uneven ground or with a tractor having a higher drawbar.

Longitudinally spaced bolt holes 121 in the jacking lever 3 for selective insertion of the bolt 5 therethrough provide for varying the length of the lever arm 9 for adjusting the hitch as may be required for tractors of different makes.

Figure 6:
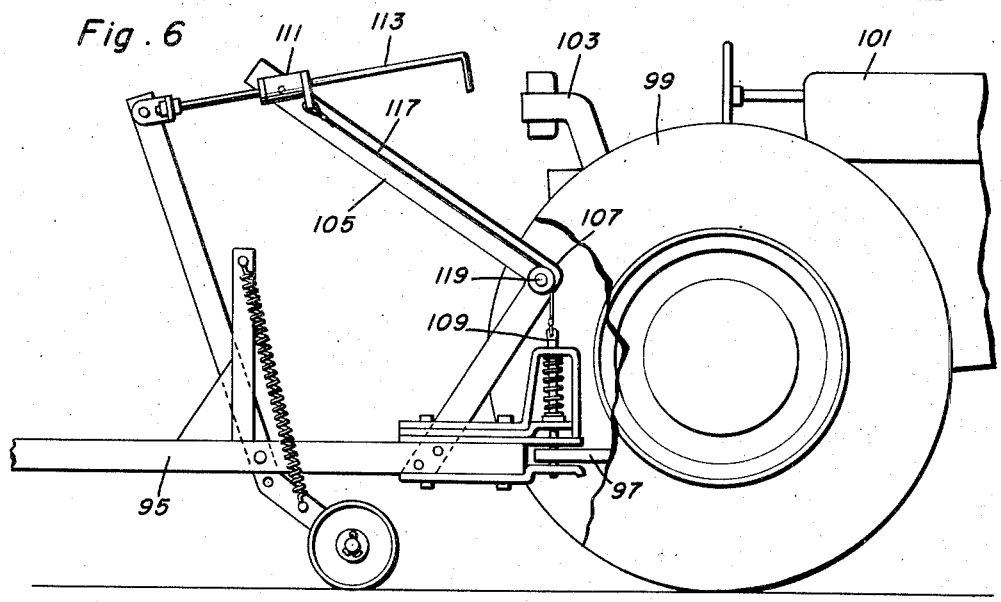
Figure 6 is a fragmentary view in side elevation partly broken away and illustrating a modified embodiment of the invention.

The modified embodiment of the invention shown in Figure 6 is designed for coupling the tongue 95 to a drawbar 97 which is positioned in between the rear wheels 99 of a tractor 101 wherein the driver's seat 103 is positioned directly over the drawbar and rearwardly of the rear wheel axle. In this embodiment, the supporting bar 105, corresponding to the bar 55 is of V-shape with its apex portion 107 substantially vertically aligned with the coupling pin 109 to dispose the bearing 111, corresponding to the bearing 70, and the push-pull rod 113 rearwardly of the seat 103, and the push-pull rod 113 is shorter, all to compensate for the different arrangement of the drawbar 97 and seat 103. A cable 117 is trained over a pulley 119 on the apex portion 107 for vertical alignment with the coupling pin 109 of the end portion of the cable attached to said pin. Otherwise the arrangement and construction is the same as in the preferred embodiment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. The combination with the vertically swingable tongue of a trailer, of hitch means on the front end of the tongue for coupling the tongue to the drawbar of a tractor and including a vertical coupling pin slidably mounted on said hitch means for advance and retraction into and from coupling position, an upright jacking lever having a terminal ground wheel and pivoted on said tongue for swinging to swing said tongue upwardly for positioning said hitch means into position for coupling to said drawbar, an operating slide rod for said lever extending forwardly therefrom and pivotally and rotatably connected thereto, means operatively connecting said rod to said pin for retracting said pin in response to rotation of said rod, and spring means for advancing said pin.

2. The combination of claim 1, said first named means comprising a sleeve splined on said shaft, means rotatably supporting the sleeve, and a cable connecting said sleeve to said pin.

3. The combination of claim 2, said sleeve having a crank arm thereon to which said cable is connected.

4. The combination of claim 2, said last means comprising a tubular bearing for said sleeve pivotally mounted for oscillation to compensate for pivoting of said rod.

5. The combination with the vertically swingable tongue of a trailer, of hitch means on the front end of the tongue for coupling the tongue to the drawbar of a tractor and including a vertical coupling pin slidably mounted on said hitch means for advance and retraction into and from coupling position, an upright jacking lever having a terminal ground wheel and pivoted on said tongue for swinging to swing said tongue upwardly for positioning said hitch means into position for coupling to said drawbar, an operating slide rod for said lever extending forwardly therefrom and pivotally and rotatably connected thereto, means operatively connecting said rod to said pin for retracting said pin in response to rotation of said rod, spring means for advancing said pin, and means yieldingly locking said lever when said tongue is swung upwardly.

References Cited in the file of this patent

UNITED STATES PATENTS

| | | |
|---|---|---|
| 1,226,687 | Mowry | May 22, 1917 |
| 1,860,391 | Meyer | May 31, 1932 |
| 2,256,310 | Braley et al. | Sept. 16, 1941 |
| 2,388,923 | Masters | Nov. 13, 1945 |
| 2,580,545 | Hill | Jan. 1, 1952 |
| 2,621,940 | Gorham | Dec. 16, 1952 |
| 2,631,862 | Johnson | Mar. 17, 1953 |